United States Patent
Zamorano Alvear et al.

(10) Patent No.: US 11,931,964 B2
(45) Date of Patent: Mar. 19, 2024

(54) 3D PRINTING COMPUTER APPLICATION 3D PRINTING USING THE SAME

(71) Applicant: HEWLETT-PACKARD DEVELOPMENT COMPANY, L.P., Spring, TX (US)

(72) Inventors: Juan Manuel Zamorano Alvear, Sant Cugat del Valles (ES); Mayid Shawi Sanchez, Sant Cugat del Valles (ES); Xavier Soler Pedemonte, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 531 days.

(21) Appl. No.: 16/970,453

(22) PCT Filed: Apr. 30, 2018

(86) PCT No.: PCT/US2018/030174
§ 371 (c)(1),
(2) Date: Aug. 17, 2020

(87) PCT Pub. No.: WO2019/212480
PCT Pub. Date: Nov. 7, 2019

(65) Prior Publication Data
US 2021/0107228 A1  Apr. 15, 2021

(51) Int. Cl.
*B29C 64/386* (2017.01)
*B33Y 50/00* (2015.01)
(Continued)

(52) U.S. Cl.
CPC ............ *B29C 64/386* (2017.08); *G06F 30/10* (2020.01); *B33Y 50/00* (2014.12); *G06F 2113/10* (2020.01)

(58) Field of Classification Search
CPC ... B29C 64/386; G06F 30/10; G06F 2113/10; B33Y 50/00
See application file for complete search history.

(56) References Cited

U.S. PATENT DOCUMENTS

| 9,395,718 B1 | 7/2016 | Church et al. |
| 9,777,380 B2 | 10/2017 | MacDonald et al. |

(Continued)

FOREIGN PATENT DOCUMENTS

| CN | 104795629 A * | 7/2015 |
| WO | WO-20170074397 | 5/2017 |
| WO | WO-2019180466 A1 * | 9/2019 | ........... B29C 64/386 |

OTHER PUBLICATIONS

Sheng, Microstrip antenna, 2015, google patents, machine translation of CN104795629A (Year: 2015).*

(Continued)

*Primary Examiner* — Robert E Fennema
*Assistant Examiner* — Yvonne Trang Follansbee
(74) *Attorney, Agent, or Firm* — Michael Dryja

(57) ABSTRACT

A method is disclosed for generating a 3D printing file containing an object model of a part having a body and an integral electronic component. To generate the 3D printing file, a processor receives at least one geometry specification of the part to be printed and at least one component performance property of the electronic component to be printed integral to the part. An object model is determined by the processor in accordance with the at least one geometry specification of a part to be printed, the at least one component performance property of an electronic component to be printed, and at least one material property of an electronic component printing material of a 3D printer. The 3D printing file is generated by the processor and comprises the object model.

13 Claims, 4 Drawing Sheets

(51) Int. Cl.
 *G06F 30/10* (2020.01)
 *G06F 113/10* (2020.01)

(56) References Cited

U.S. PATENT DOCUMENTS

| | | |
|---|---|---|
| 2005/0131657 A1 | 6/2005 | Sean Mei |
| 2014/0268604 A1 | 9/2014 | Wicker et al. |
| 2015/0001750 A1* | 1/2015 | Kozlak ............... G06K 17/00 |
| | | 264/40.1 |
| 2015/0197063 A1 | 7/2015 | Shinar et al. |
| 2015/0287247 A1 | 10/2015 | Willis et al. |
| 2016/0096318 A1 | 4/2016 | Bickel et al. |
| 2016/0198576 A1 | 7/2016 | Lewis et al. |
| 2016/0257074 A1 | 9/2016 | Levine et al. |
| 2018/0050486 A1 | 2/2018 | Talgorn et al. |

OTHER PUBLICATIONS

Pluke, A system and method for manufacture and material optimisation, 2019, machine translation of WO2019180466A1 (Year: 2019).*
Korolev; "Antenna for Satellites Printed on a 3D Printer"; Mar. 16, 2016; https://nplus1.ru/news/2016/03/16/33-antenna.
OTA; "Application of 3D Printing for Smart Objects with Embedded Electronic Sensors and Systems"; 2016, Adv. Mater. Technol. Wiley Online Library.

* cited by examiner

3D PRINTING COMPUTER APPLICATION 3D PRINTING USING THE SAME

BACKGROUND

Apparatus that generate three-dimensional objects, including those commonly referred to as "3D printers", can be used to produce three-dimensional objects. These apparatus may receive a definition of the three-dimensional object in the form of an object model. This object model is processed to instruct the apparatus to produce the object, for example, using a particulate material. The object may be produced on a layer-by-layer basis.

BRIEF DESCRIPTION OF THE DRAWINGS

Various features and advantages will become apparent from the following detailed description, taken in conjunction with the accompanying drawings, which together illustrate, given by way of example, features of the present disclosure, wherein.

DETAILED DESCRIPTION

Figure 1:
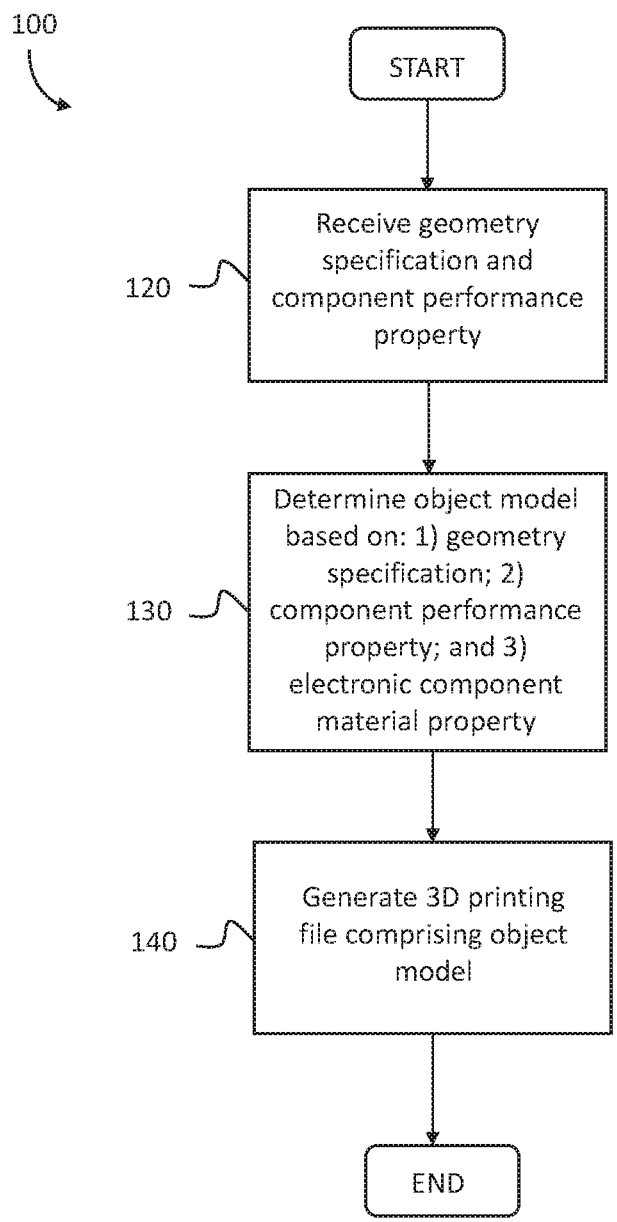
FIG. 1 is a flowchart illustrating a method, according to an example.

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

3D printing generally involves generating a 3D geometric representation of at least one part to be printed (i.e., manufactured by an additive manufacturing system such as a 3D printing system). Such a 3D geometric representation may be referred to as an object model that may be stored in a 3D data file using an appropriate file format. An object model may also define at least one material to be used to form the object. In some examples, an object model may define a first material to be used to form a first portion of an object and a second material to be used to form a second portion of that object. The 3D data file may be processed to generate instructions that are processed by a 3D printing system for reproducing the object. There are a variety of approaches for processing information in a 3D data file and enabling a user to define how an object should be manufactured using a 3D printing system.

It will be appreciated that 3D printing can be used to print a part into which an electronic component may subsequently be embedded or fitted. In other words, the embedding process happens after the part has been manufactured. The embedding process may be a manual or an automated manufacture process. In some cases, due to size, shape, or structural limitations of the printed part, a fully assembled electronic component may not be able to be inserted within the confines of the printed part to be embedded within or fitted to the printed part. In such scenarios, component parts of the electronic component may be inserted into an enclosure of the printed part, independently from one another, and, subsequently, arranged and assembled into a fully assembled electronic component within the enclosure of the printed part before the embedding or fitting process is carried out. For example, an electronic component may be assembled within a volume or cavity defined by the printed part before the embedding or fitting processes are implemented. As such, the embedding process can be time consuming, resulting in a reduction in throughput of a 3D printer and an overall increase in the time needed to produce a complete part having an embedded electronic component. In addition, the embedding of the electronic component may decrease the effectiveness of the electronic component. For example, the electronic component may be designed so that it is appropriate for a post-part production embedding process. As such, the design of such an electronic component may be limited to being able to withstand a manual or machine automated embedding process. In addition, the design of an electronic component may be limited to ensure that the electronic component can be assembled within the confines of a printed part. These limitations may restrict the performance capability of the electronic component.

In addition, in some cases, in order for the part to withstand the manual or machine automated embedding process, the design specification of the body of the part may be restricted to ensure that such an embedding process can occur. For example, the body may be designed so that the body does not exceed a certain rigidity so that the body may be manipulated when the electronic component is embedded or assembled. These limitations may restrict the performance capability of the electronic component.

Accordingly, an example of a method of 3D printing a part and an electronic component is provided. An example computer-implemented method of generating a 3D printing file for a part comprising a body and an electronic component comprises receiving, by a processor at least one geometry specification of a part to be printed and at least one component performance property of an electronic component to be printed. The example method further comprises determining, by the processor, an object model, based on at least one geometry specification of a part to be printed, the at least one component performance property of an electronic component to be printed, and at least one material property of an electronic component printing material of a 3D printer. The example method further comprises generating, by the processor, a 3D printing file comprising the object model. In this way, the example method enables a 3D printing file to contain an object model that satisfies specifications relating to the electronic component and the part overall. In addition, the example method provides a way of designing and subsequently printing an object model for a part having an integral electronic component, where the object model ensures the performance of the electronic component meets a desired performance level or capability.

The method generates a 3D printing file containing an object model that is based on both the desired part specifications and the desired electronic component specifications.

Furthermore, the subsequent 3D printing using a 3D printing file generated by the example method prints both the body of the part and the electronic component of the part together; for example on a layer-by-layer basis, and thereby creates the desired part having an integrated or integral electronic component with a desired performance capability from the 3D printing file, without the need for a manual post-part production process to embed or assemble the component within the printed part to form the end product.

In this way, down-time of a 3D printing system may be reduced thereby reducing manufacturing and development costs.

The example method may be implemented by a computer processor. In a further example, the example method may be implemented through a computer application.

FIG. 1 is a flowchart illustrating a method 100 of generating a 3D printing file for a part having a body and an electronic component, according to an example. The method 100 begins at block 120, where a processor receives at least one geometry specification of the part to be printed and at least one component performance property of the electronic component to be printed.

The at least one geometry specification of the part to be printed may be one of the following: a dimension; a shape; a volume; a height; a width; a depth; and a curvature. The at least one component performance property may be a specified criteria and may be of at least one of the following: conductance; resistance; capacitance; and a dielectric property.

At block 130, the processor determines, an object model for the part, based on the at least one geometry specification of the part to be printed, the at least one component performance property of the electronic component to be printed, and at least one material property of an electronic component printing material of a 3D printer.

The at least one material property of the electronic component may be a specified criteria and may be at least one of the following: a conductive property, for example a conductive agent doping intensity; a resistive property; a dielectric property; and a metallic property. In some examples, the electronic component may comprise at least one conductive material and at least one dielectric material, in such cases, the at least one material property may define at least one conductive property of the conductive material and at least one dielectric property of the dielectric material. The at least one material property may be a property specified at a voxel level of a digital representation of the printing material, for example, a voxel level of an object model, where a voxel of an object model may be generated in a printed part as a result of printing one or more printing materials.

In one example, the object model may be determined based on at least one material property of the part body to be printed.

In one example, a material property of the electronic component printing material, for example a dielectric property, may be the same as a material property of the part body, such that a dielectric material of the electronic component is the same as a dielectric material of the part body.

Following the determination of block 130, the method 100 proceeds to block 140, where the processor generates a 3D printing file comprising the at least one object model.

The 3D printing file may be sent to a 3D printer (see element 300 of FIG. 4) so that the part according to the object model of the 3D printing file can be printed. In one example, the 3D printing file is provided to a 3D printer that has the capability to produce parts containing different materials, such as conductive and non-conductive materials. In one example, the 3D printing file is provided to a 3D printer that has the capability to change conductive properties of its printing material, in accordance with the object model of the 3D printing file. A further example of a 3D printing system, to which the 3D printing file may be provided is a fused deposition modelling (FDM) 3D printing system.

The electronic component may be at least one of the following: a conductive element; a conductive trace; an antenna; a passive adaptation element, for example a capacitor or an inductor; a resistor; and a connector. In one example, the body and the electronic component may, together, form an antenna having conductive and non-conductive portions, thereby being printed from a conductive material and a non-conductive (dielectric) material.

Figure 2:
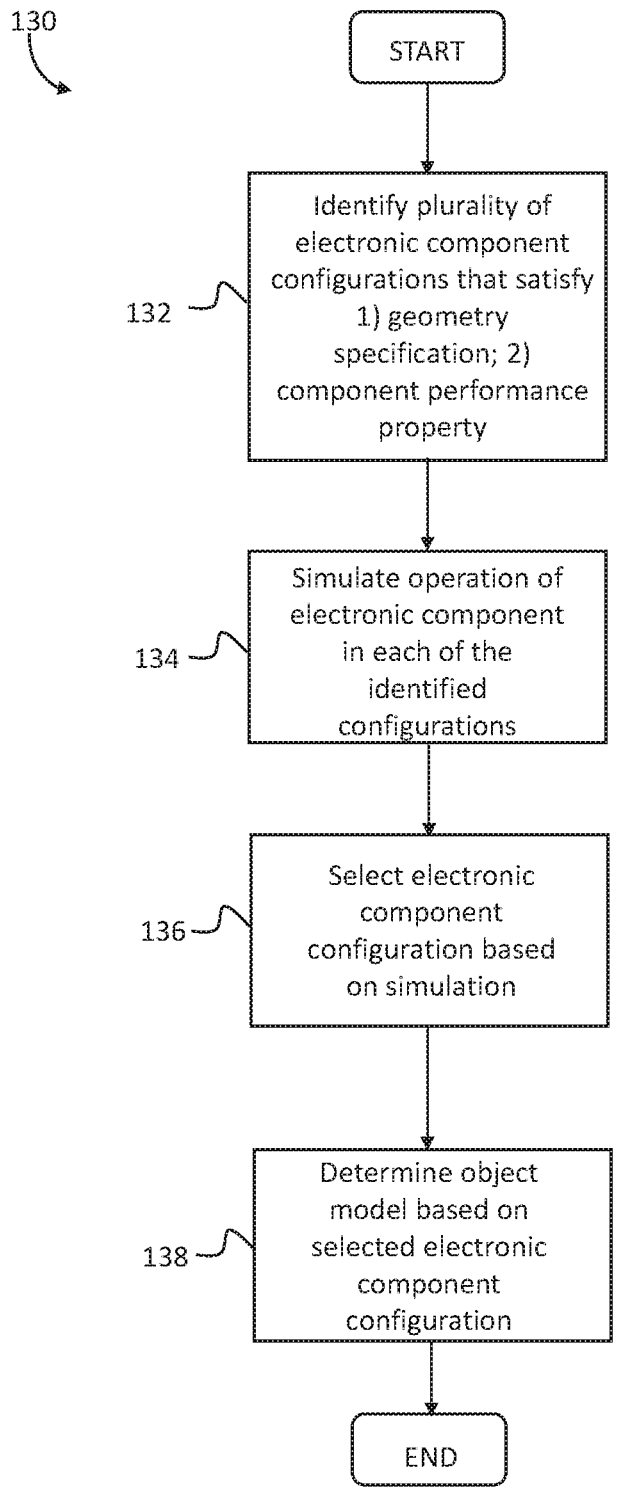
FIG. 2 is a flowchart illustrating a method, according to a further example.

Referring to FIG. 2, the determination of block 130 in the method 100 is described in more detail. The determination of block 130 begins at block 132 where a plurality of electronic component configurations that satisfy the at least one geometry specification of the part to be printed and the at least one component performance property of the electronic component are identified. The process of block 130 works to determine configurations that enable the electronic component to fit within the size and shape of the part to the be printed. In one example, the process of block 130 may identify configurations that allow the electronic component to be as large as possible within the geometry of the printed part, that is, within the external surface of the part body. In one example, the plurality of electronic component configurations may be retrieved by performing a look-up or search operation on a configuration library containing various electronic component configurations.

In one example, the electronic component to be printed may be an antenna. In such a case, the configuration library may contain a number of antenna primitives each of which may define different antenna shapes, for example, a loop antenna, an F antenna, an inverted F antenna, and a planar antenna.

Next, the method 130 proceeds to block 134, where operation of an electronic component in each of the plurality of electronic component configurations is simulated. The simulation occurs based on the identified configurations and the at least one material property of an electronic component printing material.

In the case where the configuration library contains antenna primitives, the simulation of block 134 may simulate each of the identified antenna primitives based on the material property of antenna printing material of a 3D printer to which the 3D printing file may be provided. The simulation may be carried out by an electromagnetic simulator. For example, an electromagnetic simulator that has the ability to simulate performance of electronic components for example, performance of at least one of: a conductive element; a conductive trace; an antenna; a passive adaptation element, for example a capacitor or an inductor; a resistor; and a connector.

In one example, the simulation may model the identified configurations in scaled up or down versions that would correspond to the size and shape of the configurations as if they were incorporated into the printed part.

In one example, the simulation of block 134 may comprise a plurality of phases. A first phase may be a modification phase in which each of the identified configurations is modified to provide a component performance property that is as close as possible to or the same as the at least one component performance property of the electronic component. The component performance property of an identified configuration may be the same as the at least one component performance property of the electronic component when there is no variation between the two or when such variation has a negligible effect on the component performance. In the latter scenario, such a variation may be defined by percentage difference or equivalent. The component performance property of the identified configuration may be as close as possible to the at least one component performance property of the electronic component when no further modifications can be made to the electronic configuration that will bring the component performance closer to or within a threshold from the at least one component performance property of the electronic component.

In another example, the component performance property of the identified configurations may be as close as possible to the at least one component performance property of the electronic component when a threshold number of modifications have been made to the electronic component configuration.

As an example, where the electronic component is an antenna and the at least one component performance property of the electronic component is an operating frequency the modification phase may scale the size of the identified configurations up or down. In another example, where the electronic component is a capacitor and the at least one component performance property of the electronic component is a capacitance, the modification phase may scale one or more of the surface sizes of the identified configurations of the capacitor and the distance between the surfaces of the identified configurations of the capacitor. Following the modification, the modified electronic component configurations may be allocated to the part to be printed. A second phase of the simulation of block 134 may be an iteration phase, where performance of each modified electronic component configuration is simulated and then evaluated. Further simulations may be based on the evaluation. In more detail, performance of a first electronic component configuration may be simulated and subsequently evaluated. The evaluation of the first electronic component configuration may form part of a feedback loop in the iteration phase. The evaluation may provide feedback that causes a change in a variable defining the first electronic component configuration. Following this change, performance of the latest version of the first electronic component configuration may be simulated and the iteration process may be repeated until the evaluation determines that the configuration in question provides a satisfactory outcome.

In another example, the evaluation of the performance of the first electronic component configuration may provide feedback that causes performance of a second electronic component configuration to be simulated. This may occur when the first electronic component configuration is deemed to provide a satisfactory level of performance.

The iteration phase may continue until performance of each identified electronic component configuration has been simulated and evaluated. The evaluation of each electronic component configuration may be stored. In one example, the evaluation may include a scoring process where each simulation (each identified electronic component configuration) is scored and evaluated relative to the other simulations.

In one example, the iteration phase may be followed by an assessment phase that ranks the electronic component configurations based on their respective simulation evaluations or scores. In one example, the assessment phase may discard one or more electronic configurations based on their ranking. In a further example, the assessment phase may initiate further iteration of one or more electronic configurations based on their ranking.

Following the simulation of each of the electronic component configurations, at block 136, an electronic component configuration is selected based on the simulated operation. The selection is based on the electronic component configuration that provides component performance that is closest to the component performance property of the electronic component to be printed integral to the part. In one example, the selection may be based on the previously described assessment phase.

Next, at block 138, the object model is determined based on the selected electronic component configuration.

In one example, feedback may be provided to a user of a computer application implementing the methods 100 and 130. The user feedback may indicate that one or more of the geometry specification, the electronic component printing material, and the electronic component performance property cannot be met in generation of an object model. The user feedback may indicate proposed changes to one or more of the geometry specification, the electronic component performance property, the electronic component printing material, and the part body printing material in response one or both of the identification or simulation processes. As an example, a proposed change may be a proposed change to the at least one geometry specification of the part to be printed, such as an increase in size of the part.

A 3D printing file, containing an object model, generated, as described above, provides increased flexibility in part design, for example, part design of a part having an embedded antenna. In addition, such 3D printing files can provide a tailored object model that meets at least one component performance property.

Figure 3:
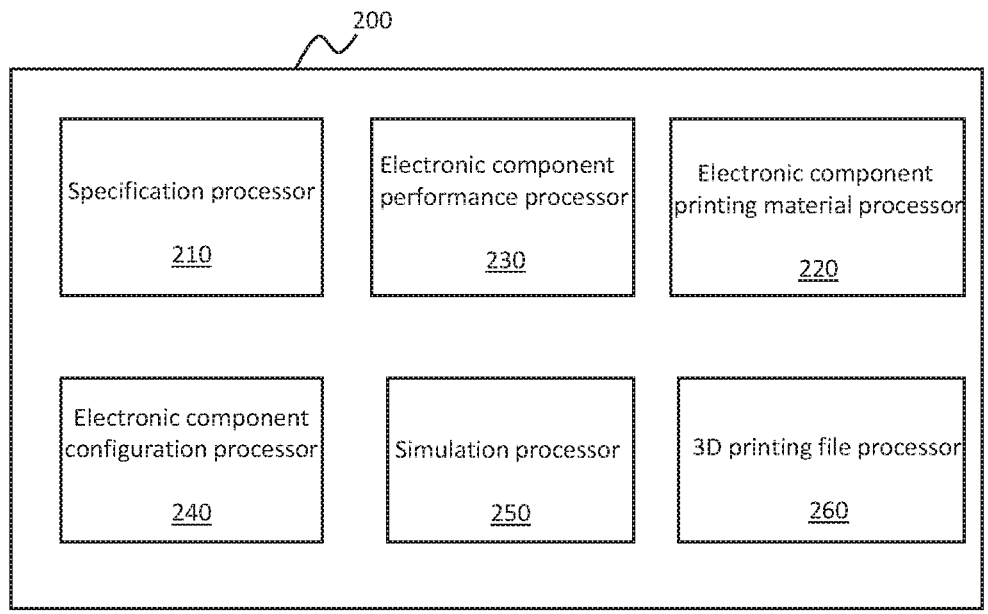
FIG. 3 is a schematic diagram of a processing engine, according to an example.

FIG. 3 is a schematic diagram of a processing engine 200 for implementing the methods 100 and 130. The processing engine 200 has a plurality of sub-processing elements that implemented the methods described in relation to FIGS. 1 and 2. The processing engine 200 may be a part of a computing device, which provides a computer application that implements the methods described in relation to FIGS. 1 and 2 using the processing engine. The computer application may be one of a plurality of computer applications in a 3D printing application suite.

Referring to FIG. 3, the processing engine 200 has a part specification processor 210, an electronic component printing material processor 220, and an electronic component performance processor 230. In addition, the processing engine has an electronic component configuration processor 240. The electronic component configuration processor 240 is communicatively coupled to the part specification processor 210 and the electronic component performance processor 230.

The processing engine 200 also has a simulation processor 250. The simulation processor 250 is communicatively coupled to the electronic component printing material processor 220 and the electronic component configuration processor 240.

The processing engine 200 also has a 3D printing file processor 260. The 3D printing file processor 260 is communicatively coupled to the simulation processor 250.

The part specification processor 210 provides at least one geometry specification of the part to be printed to the electronic component configuration processor 240 and the electronic component performance processor 230 provides at least one component performance property of the electronic component to be printed to the electronic component configuration processor 240.

Based on the received at least one geometry specification of the part to be printed and at least one component performance property of the electronic component to be printed, the electronic component configuration processor 240 identifies a plurality of electronic component configurations that satisfy said geometry and performance specifications. In one example, the electronic component configuration processor 240 may be in communication with an electronic component configuration library that stores a plurality of electronic component configurations. The electronic component configuration processor 240 may perform a look up or search operation on such a library. As discussed above, for a case where the electronic component is an antenna the library may be an antenna primitive library.

The electronic component configuration processor 240 provides the identified electronic component configurations to the simulation processor 250. The simulation processor 250 receives at least one material property of the printing material of the electronic component to be printed from the electronic component printing material processor 220.

The simulation processor 250 simulates operation of an electronic component having the at least one material property and each of the identified electronic component configurations. An electronic component configuration is selected by the simulation processor 250 based on the results of the simulations. The selection may be based on how close the electronic configuration is to the at least one component performance property.

The simulation processor 250 provides the selected electronic component configuration, or data representative thereof, to the 3D printing file processor 260. The 3D printing file processor 260 generates an object model based on the selected electronic component configuration.

Figure 4:
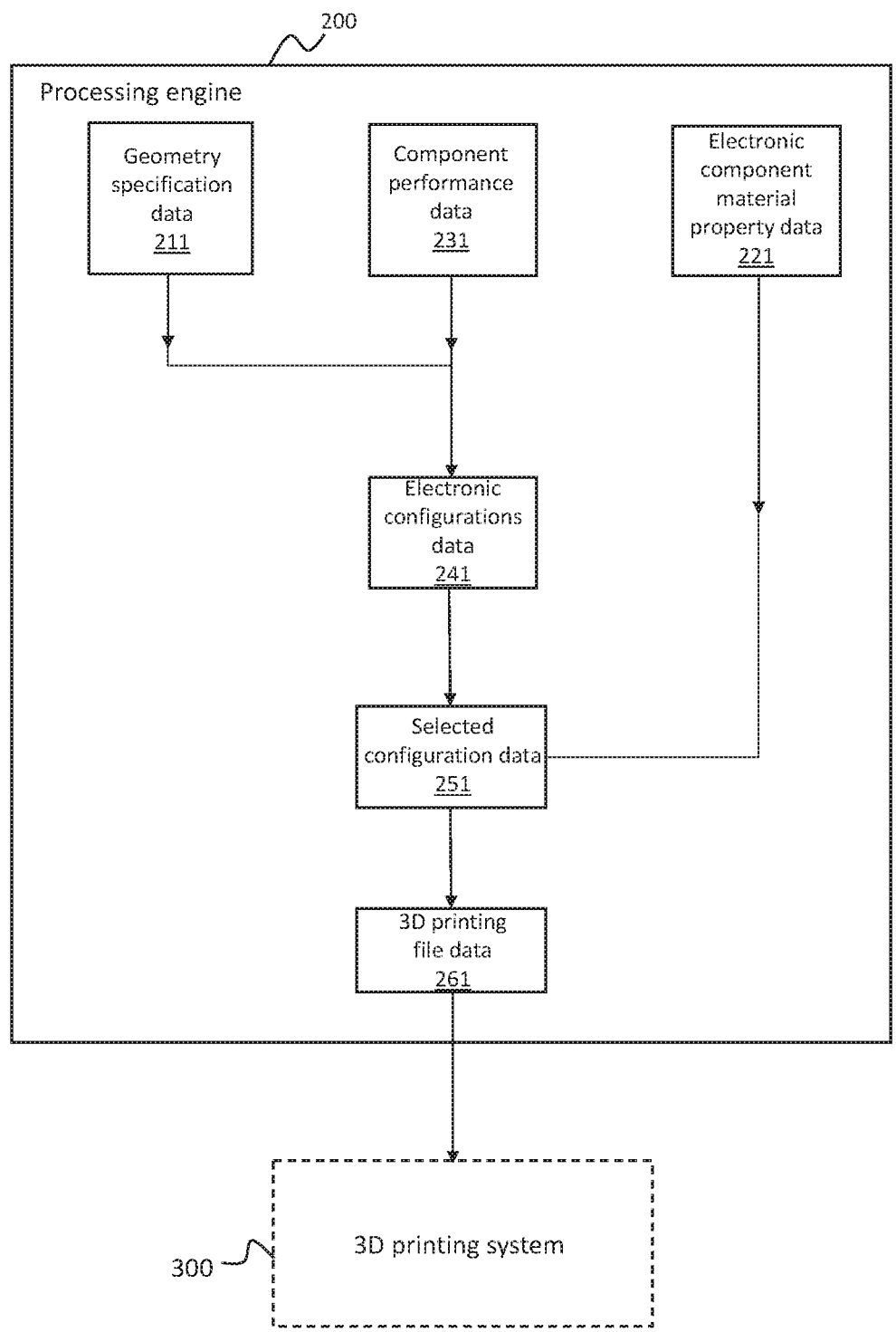
FIG. 4 is a schematic diagram of the processing engine of FIG. 3, according to an example.

FIG. 4 is a functional schematic diagram of interaction between the sub-processors of the processing engine 200 in implementing the methods 100 and 130. FIG. 4 depicts the data transfers between the sub-processors of processing engine 200.

A data file 211 contains data that relates to the geometry specification of the part to be printed and a data file 231 contains data that relates to the at least one component performance property of the electronic component. The data files 211 and 231 form the basis of the operation of the electronic component configuration processor 240 (see FIG. 3) to identify a plurality of electronic component configurations that satisfy the geometry and performance specifications. These electronic component configurations are represented by a data file 241.

A data file 221 contains data that relates to the at least one material property of an electronic component printing material. The data file 221 and the data file 241 contain data that is the basis of the simulations performed by the simulation processor 250.

As described in relation to FIG. 3, the selection of an electronic component configuration is based on the results of the simulations. A data file 251 contains data that relates to the selected configuration and is therefore based on at least part of the data within data file 241. The selected configuration is used to determine an object model for the part to be printed and a data file 261 contains data that relates to the 3D printing file containing the object model. The data 261 file is transmitted to a 3D printing system 300, such as a 3D printer, so that the part can be printed in accordance with the object model.

A 3D printing system may be configured to receive and print a part in accordance with a 3D printing file generated as described above.

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random-access memory (RAM), a read-only memory (ROM), an erasable programmable read-only memory, or a portable compact disc.

In one example, a computer readable medium may contain instructions, that when executed by a processor, cause the above-described methods to be implemented.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed in any one example.

The invention claimed is:

1. A method comprising:
receiving, by a processor:
a geometry specification of a part to be three-dimensionally (3D) printed using a 3D printer; and
a performance specification of an electronic component to be integrally 3D printed within the part;
retrieving, by the processor and from a configuration library, a plurality of physical configurations of the electronic component that satisfy the geometry specification of the part to be printed, each physical configuration defining a corresponding shape of the electronic component;
simulating, by the processor and for each physical configuration, an operating performance of the electronic component if the electronic component were to have the physical configuration when integrally 3D printed within the part having the geometry specification;
determining, by the processor, an object model of the part including, from among the plurality of physical configurations, a particular physical configuration having the simulated operating performance that most closely matches the performance specification of the electronic component, the object model determined according to the specification of the part, the performance specification of the electronic component, and a material property of an electronic component printing material of the 3D printer with which the electronic component is to be integrally 3D printed within the part;
generating, by the processor, a 3D printing file comprising the object model of the part in which the electronic component is integrally 3D printed within the part with the particular physical configuration; and
causing, by the processor, the 3D printer to 3D-print the part including the electronic component with the particular physical configuration, such that the electronic component is integrally printed within the part.

2. The method of claim 1, wherein simulating for each physical configuration, the operating performance of the electronic component if the electronic component were to have the physical configuration when integrally 3D printed within the part having the geometry comprises:
modifying the physical configuration such that the operating performance is closer to the performance specification of the electronic component;
simulating the operating performance of the electronic component if the electronic component were to have the physical configuration when integrally 3D printed within the part having the geometry specification; and repeating modification of the physical configuration and simulation of the operating performance of the electronic component one or more times.

3. The method of claim 1, further comprising receiving, by the processor:

a material property of a part printing material of the 3D printer.

4. The method of claim 3, wherein the material property of the part printing material is provided at a voxel level of the 3D printer that is to 3D-print the part.

5. The method of claim 1, wherein the electronic component printing material comprises a conducting material and a dielectric material.

6. The method of claim 5, further comprising receiving, by the processor:

a material property of a part printing material of the 3D printer, wherein the part printing material comprises a dielectric material matching the dielectric material of the electronic component printing material.

7. The method of claim 1, wherein the material property of the electronic component printing material is provided at a voxel level of the 3D printer that is to 3D-print the part.

8. The method of claim 1, wherein the electronic component comprises an antenna.

9. The method of claim 8, wherein the performance specification specifies one or multiple of: an antenna operating frequency, an antenna gain, and an antenna directivity.

10. A 3D printing system comprising:

a processor; and a memory storing program code executable by the processor to:

receive:
a geometry specification of a part to be three-dimensionally (3D) printed using a 3D printer; and
a performance specification of an electronic component to be integrally 3D printed within the part;

retrieve, from a configuration library, a plurality of physical configurations of the electronic component that satisfy the geometry specification of the part to be printed, each physical configuration defining a corresponding shape of the electronic component;

simulate, for each physical configuration, an operating performance of the electronic component if the electronic component were to have the physical configuration when integrally 3D printed within the part having the geometry specification;

determine an object model of the part including, from among the plurality of physical configurations, a particular physical configuration having the simulated operating performance that most closely matches the performance specification of the electronic component, the object model determined according to the specification of the part, the performance specification of the electronic component, and a material property of an electronic component printing material of the 3D printer with which the electronic component is to be integrally 3D printed within the part;

generate a 3D printing file comprising the object model of the part in which the electronic component is integrally 3D printed within the part with the particular physical configuration; and cause the 3D printer to 3D-print the part including the electronic component with the particular physical configuration, such that the electronic component is integrally printed within the part.

11. The 3D printing system of claim 10, further comprising the 3D printer.

12. The 3D printing system of claim 10, wherein the program code is executable by the processor to simulate, for each physical configuration, the operating performance of the electronic component if the electronic component were to have the physical configuration when integrally 3D printed within the part having the geometry by:

modifying the physical configuration such that the operating performance is closer to the performance specification of the electronic component;

simulating the operating performance of the electronic component if the electronic component were to have the physical configuration when integrally 3D printed within the part having the geometry specification; and repeating modification of the physical configuration and simulation of the operating performance of the electronic component one or more times.

13. A non-transitory computer readable data storage medium storing instructions that when executed by a processor cause the processor to perform processing comprising:

receiving:
a geometry specification of a part to be three-dimensionally (3D) printed using a 3D printer; and
a performance specification of an electronic component to be integrally 3D printed within the part;

retrieving, from a configuration library, a plurality of physical configurations of the electronic component that satisfy the geometry specification of the part to be printed, each physical configuration defining a corresponding shape of the electronic component;

simulating, for each physical configuration, an operating performance of the electronic component if the electronic component were to have the physical configuration when integrally 3D printed within the part having the geometry specification;

determining an object model of the part including, from among the plurality of physical configurations, a particular physical configuration having the simulated operating performance that most closely matches the performance specification of the electronic component, the object model determined according to the specification of the part, the performance specification of the electronic component, and a material property of an electronic component printing material of the 3D printer with which the electronic component is to be integrally 3D printed within the part;

generating a 3D printing file comprising the object model of the part in which the electronic component is integrally 3D printed within the part with the particular physical configuration; and causing the 3D printer to 3D-print the part including the electronic component with the particular physical configuration, such that the electronic component is integrally printed within the part.

* * * * *